Aug. 20, 1963     J. M. JACKSON, JR     3,101,242
PROCESS OF MAKING FLEXIBLE ABSORBENT MATERIAL
Filed Feb. 1, 1961
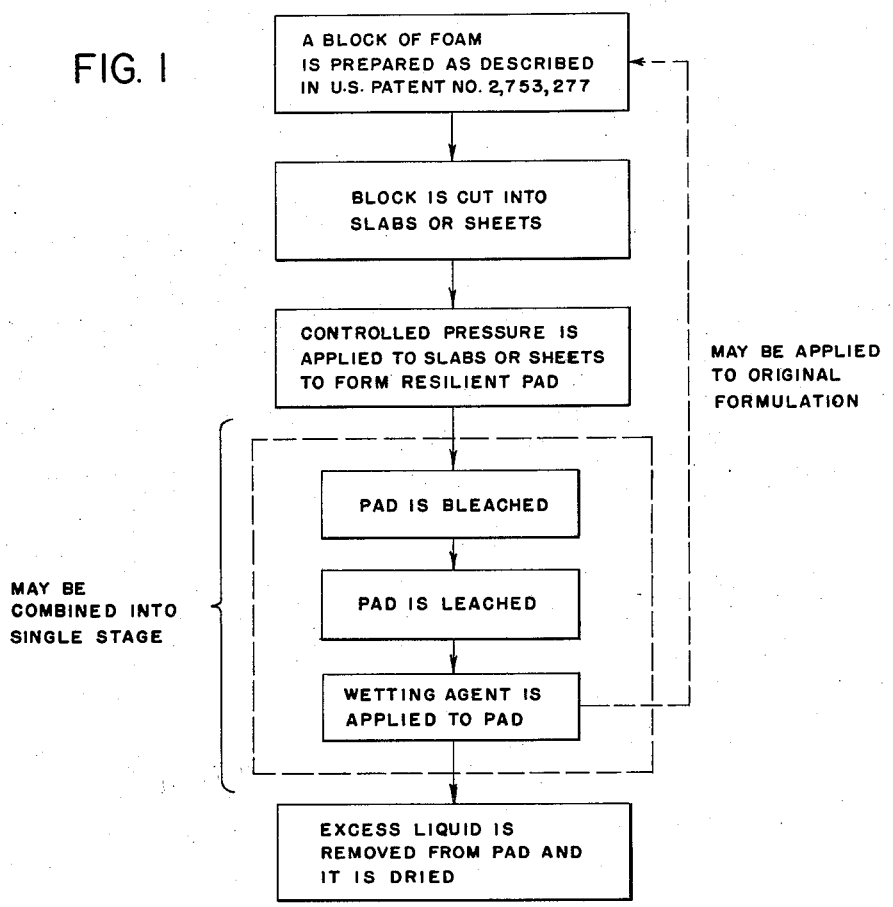
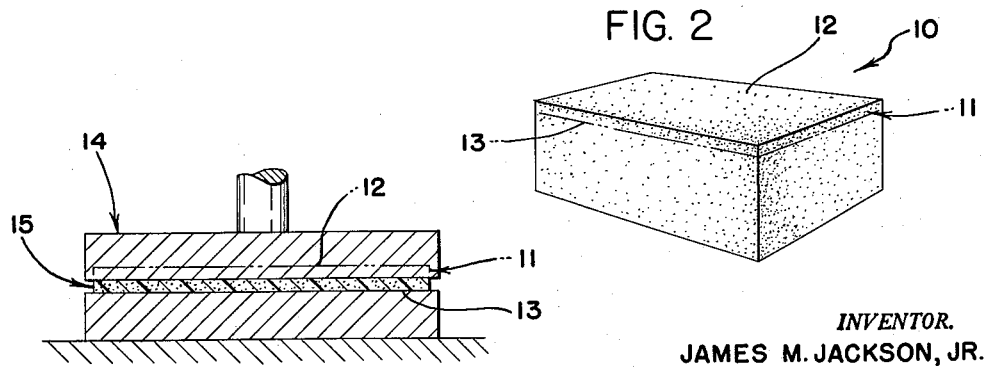
INVENTOR.
JAMES M. JACKSON, JR.
BY *Ely, Frye & Hamilton*
ATTORNEYS

United States Patent Office 3,101,242
Patented Aug. 20, 1963

3,101,242
PROCESS OF MAKING FLEXIBLE ABSORBENT MATERIAL
James M. Jackson, Jr., Akron, Ohio, assignor to The V. L. Smithers Manufacturing Company, Kent, Ohio, a corporation of Ohio
Filed Feb. 1, 1961, Ser. No. 86,501
12 Claims. (Cl. 18—47.5)

The invention relates generally to the production of absorbent synthetics resinous foam, and more particularly to producing a pad of such material in a soft, flexible and resilient condition.

A preferred type of material suitable for the present invention is phenol-formaldehyde foam made according to the method described in Patent No. 2,753,277, where it is used in the form of a mass or block for supporting the stems of cut flowers and supplying them with moisture over prolonged periods. The mass or block has very little resiliency, a density of about 1.5 pounds per cubic foot, and is crushable or frangible to allow penetration of the flower stems without distortion of the block, so that the flowers are supported in a desired arrangement. Such material is clearly not suitable as an absorbent pad because it would break under slight strain or pressure.

The object of the present invention is to produce a synthetic resinous foam pad which is highly absorbent, soft, flexible and resilient, and which has been purged of toxic substances, such as formaldehyde.

The novel product is obtained by an improved method of treating the foamed material, and the following description of the product and method is set forth as the preferred and best known mode of carrying out the invention in such terms as to enable those skilled in the art to practice the same. The invention is not limited to the details of description but may be modified within the scope of the sub-joined claims.

In the drawings:

FIG. 1 is a flow sheet of the process of making flexible, absorbent material according to the present invention;

FIG. 2 is a perspective view of a block of frangible foam made in accordance with Patent No. 2,753,277, showing in phantom the lines along which a slab is cut from the block; and, FIG. 3 is a schematic cross section showing the crushing of a frangible slab according to the invention.

While the invention is described as applied to treating a phenolic condensation resin such as phenol-formaldehyde foam, it is to be understood that it may be applied to other synthetic resinous foams adaptable for producing a product having the essential features of the invention, by treatment of the foamed material according to the improved process. For example, urea-formaldehyde foam is adaptable for producing the novel product when the improved process is applied to said foam. Foams which are suitable must be capable of producing a highly absorbent non-toxic material which is soft and flexible.

In preparing a phenol-formaldehyde foam the formulation and procedure is generally similar to that described in said Patent No. 2,753,277. Phenol-formaldehyde resin is obtained in graduated viscosities from the manufacturer, and is proportioned in accordance with the density of foam desired. In making foam for the present invention having a density of about 0.5 pound per cubic foot the following formula is given as an example:

|  | Parts by weight |
|---|---|
| BRLA 2759 resin | 60 |
| BRLA 2760 resin | 40 |
| Tween-40 | 5 |
| Sulfuric, acid, isopropyl ether and phosphoric acid mixture | 13 |

BRLA 2759 and BRLA 2760 are phenol-formaldehyde resins in liquid form, having different standard commercial viscosities, and obtainable from Union Carbide Company.

"Tween-40" is a material obtainable from Atlas Powder Company, said to be polyoxyethylene sorbitan monopalmitate, and is used to control brittleness and impart a certain degree of softness and resilience to the finished foam. It also has wetting agent properties. The sulfuric acid, isopropyl ether and phosphoric acid mixture is the foaming agent and hardener. The proportions of these materials are varied in accordance with the results desired, and as no invention is claimed for the materials and the process thus far described, they being well known, further details are unnecessary.

A batch of the foregoing ingredients is molded into a relatively large block of foam 10, as shown in FIG. 2, in the manner described in Patent No. 2,753,277 and the finished foam will be very frangible and light in weight, with slight resilience, and easily crushed or indented by pressing thereon with one's finger.

In accordance with the present invention, the block of foam 10 is cut into slabs or sheets 11 about ¼" in thickness, for example, although this dimension may vary as desired. The best results are obtained if the length or width of the slabs 11 is parallel to the natural grain of the foam; that is, the direction of greatest expansion. The slabs 11 are fragile and easily broken by bending.

Next the slab 11 is made flexible and resilient by carefully controlled pressure applied perpendicularly to the top and bottom surfaces 12 and 13, respectively, by means of rolls or a press 14, to partially crush the cellular structure of the slab. For a slab ¼" thick having a density of 0.5 pound per cubic foot, the pressure applied should be about 3 to 4 pounds per square inch. This pressure reduces the thickness of the slab to about ⅛", and the resulting pad 15 has many times its original flexibility, softness and resilience, so that it may be bent to a substantial extent without breaking. Control of the pressure is very important as too much pressure destroys resilience and greatly reduces absorbency, while too little pressure produces insufficient flexibility and makes the pad easily breakable by slight bending. Obviously, the pressure varies somewhat with various densities. However, the pressure required does not depend upon thickness, as the same 3 to 4 pounds pressure can be used on a slab ¼" to 1" thick having substantially the same density.

Generally speaking, sufficient pressure is applied to reduce the thickness of the slab to about ¼–¾ of its original thickness.

The pressed pad is preferably bleached to lighten its color and leached in a solution to remove water-soluble chemicals, e.g., the residue from the foaming agent, thus neutralizing the pad 15. Also, it is preferred to apply a known wetting agent to the foam to increase its absorptive capacity.

Preferably, the pressed pad 15 is soaked thoroughly in a solution which contains bleaching, leaching and wetting agents. An example of such solution is as follows:

| Water | gallons | 1 |
|---|---|---|
| Igepal CO630 | grams | 2 |
| Ammonium Hydroxide, 30% strength | do | 20 |

The "Igepal," obtainable from Antara Chemicals, a sales division of General Aniline & Film Corp., acts as the wetting agent, and is said to be an alkylphenoxypolyethanol condensation product. Ammonium hydroxide bleaches and leaches out or neutralizes the undesirable water-soluble chemicals. After soaking, the pad is squeezed to remove most of the water solution. The wetting agent provides quick absorption of the solution as well as quick absorption of water after the pad has been squeezed out and dried. Also, it is possible to include the wetting agent in required quantity in the original formulation for making the foam.

The ammonium hydroxide may be applied as a gas by first exposing the pad to ammonium hydroxide fumes or gas, then soaking in a water solution of Igepal CO630, and then squeezing out the solution and soluble chemicals. If the washing is not necessary to the final use for which the pad is adapted, the pad may be treated with ammonia and then sprayed or treated with a wetting agent, thus eliminating the washing or immersion in a water solution.

While I have described the method of producing a novel pad according to the invention having a density of 0.5 pound per cubic foot, pads having the required characteristics can be made in densities varying from about 0.3 pound to 1.4 pounds per cubic foot, by varying the formulation of the foam, and correspondingly varying the pressure applied to the foamed slabs. With higher densities than 1.4 pounds per cubic foot, the proportion of "Tween-40" must be substantially increased to obtain the necessary flexibility and resilience after pressing.

The soft, flexible and resilient pads may be made in various dimensions to suit a great variety of uses.

What is claimed is:

1. The method of making a flexible foam pad, comprising the steps of preparing a mass of synthetic frangible resinous foam having a density of 0.3 to 1.4 pounds per cubic foot and containing a wetting agent, cutting a slab from the mass, rendering said slab flexible and resilient solely by applying pressure to the top and bottom surfaces of the slab in an amount to partially crush the slab, and neutralizing said slab.

2. The method of making a flexible foam pad, comprising the steps of preparing a mass of synthetic frangible resinous foam having a density of 0.3 to 1.4 pounds per cubic foot and containing a wetting agent, cutting a slab from the mass having its length or width dimension in the direction of greatest expansion of the foam, rendering said slab flexible and resilient solely by applying pressure to the top and bottom surfaces of the slab in an amount to partially crush the slab, and neutralizing said slab.

3. The method of making a flexible foam pad, comprising the steps of preparing a mass of synthetic frangible resinous foam having a density of 0.3 to 1.4 pounds per cubic foot, cutting a slab from the mass, rendering said slab flexible and resilient solely by applying pressure to the top and bottom surfaces of the slab in an amount to partially crush the slab, and soaking the flexible pad in a water solution containing a neutralizing agent and a wetting agent.

4. The method of making a flexible absorbent foam pad, comprising the steps of preparing a mass of synthetic frangible resinous foam having a density of 0.3 to 1.4 pounds per cubic foot, cutting a slab from the mass, rendering said slab flexible and resilient solely by applying pressure to the top and bottom surfaces of the slab in an amount to partially crush the slab, and treating the flexible pad with ammonium hydroxide and a wetting agent.

5. The method of making a flexible absorbent foam pad, comprising the steps of preparing a mass of synthetic frangible resinous foam having a density of 0.3 to 1.4 pounds per cubic foot, cutting a slab from the mass, rendering said slab flexible and resilient solely by applying pressure to the top and bottom surfaces of the slab in an amount to partially crush the slab, and soaking the flexible pad in a water solution containing ammonium hydroxide and a wetting agent.

6. The method of making a flexible absorbent foam pad, comprising the steps of preparing a mass of phenol-formaldehyde foam having a density of 0.3 to 1.4 pounds per cubic foot and containing a wetting agent, cutting a slab from the mass, rendering said slab flexible and resilient solely by applying pressure to the top and bottom surfaces of the slab in an amount to partially crush the slab, and neutralizing said slab.

7. The method of making a flexible absorbent foam pad, comprising the steps of preparing a mass of phenol-formaldehyde foam having a density of 0.3 to 1.4 pounds per cubic foot and containing a wetting agent, cutting a slab from the mass having its length or width dimension in the direction of greatest expansion of the foam, rendering said slab flexible and resilient solely by applying pressure to the top and bottom surfaces of the slab in an amount to partially crush the slab, and neutralizing said slab.

8. The method of making a flexible absorbent foam pad, comprising the steps of preparing a mass of phenol-formaldehyde foam having a density of 0.3 to 1.4 pounds per cubic foot, cutting a slab from the mass, rendering said slab flexible and resilient solely by applying pressure to the top and bottom surfaces of the slab in an amount to partially crush the slab, and treating the flexible pad with ammonium hydroxide and a wetting agent.

9. The method of making a flexible absorbent foam pad, comprising the steps of preparing a mass of synthetic frangible resinous foam having a density of 0.3 to 1.4 pounds per cubic foot and containing a wetting agent, cutting a slab from the mass, and rendering said slab flexible and resilient solely by applying pressure to the top and bottom surfaces of the slab in an amount to partially crush the slab.

10. The method of making a flexible absorbent foam pad, comprising the steps of preparing a mass of synthetic frangible resinous foam having a density of 0.3 to 1.4 pounds per cubic foot and containing a wetting agent, cutting a slab from the mass, said cut being made parallel to the direction of greatest expansion of the foam, and rendering said slab flexible and resilient solely by applying pressure to the top and bottom surfaces of the slab in an amount to partially crush the slab.

11. The method of making a flexible foam pad, comprising the steps of preparing a mass of synthetic frangible resinous foam having a density of 0.3 to 1.4 pounds per cubic foot and containing a wetting agent, cutting a slab from the mass, and rendering said slab flexible and resilient solely by applying pressure to the top and bottom surfaces of the slab in an amount to partially crush the slab.

12. The method of making a flexible foam pad, comprising the steps of preparing a mass of synthetic frangible resinous foam having a density of 0.3 to 1.4 pounds per cubic foot and containing a wetting agent, cutting a slab from the mass, said cut being made parallel to the direction of greatest expansion of the foam, and rendering said slab flexible and resilient solely by applying pressure to the top and bottom surfaces of the slab in an amount to partially crush the slab.

References Cited in the file of this patent

UNITED STATES PATENTS

| | | |
|---|---|---|
| 2,384,387 | Myer | Sept. 4, 1945 |
| 2,609,347 | Wilson | Sept. 2, 1952 |
| 2,659,935 | Hammon | Nov. 24, 1953 |
| 2,744,291 | Stastny et al. | May 8, 1956 |
| 2,753,277 | Smithers | July 3, 1956 |